(12) United States Patent
Pedone

(10) Patent No.: US 7,051,065 B2
(45) Date of Patent: May 23, 2006

(54) METHOD AND SYSTEM FOR PERFORMING FAULT-TOLERANT ONLINE VALIDATION OF SERVICE REQUESTS

(75) Inventor: Fernando Pedone, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 09/931,989

(22) Filed: Aug. 17, 2001

(65) Prior Publication Data

US 2003/0055873 A1    Mar. 20, 2003

(51) Int. Cl.
*G06F 13/00* (2006.01)
(52) U.S. Cl. ..................................... 709/200; 718/102
(58) Field of Classification Search ........ 709/200–203, 709/223–226; 718/1, 102, 103
See application file for complete search history.

(56) References Cited

U.S. PATENT DOCUMENTS

| | | | |
|---|---|---|---|
| 6,295,345 B1* | 9/2001 | Pullen et al. | 379/114.28 |
| 2002/0029200 A1* | 3/2002 | Dulin et al. | 705/67 |
| 2004/0022379 A1* | 2/2004 | Klos et al. | 379/201.01 |

* cited by examiner

*Primary Examiner*—Moustafa M. Meky

(57) ABSTRACT

A method and distributed computing system for validation of service requests includes determining in first and second processes that a request for service has not been previously validated; transmitting from the first and second processes messages having information indicative of the transmitting from the first or second process and the request for service; storing the information in the first and second processes; and accepting the request for service in the first or second process after the message is transmitted and message related information is different from the information stored in the respective first or second process.

20 Claims, 2 Drawing Sheets

METHOD AND SYSTEM FOR PERFORMING FAULT-TOLERANT ONLINE VALIDATION OF SERVICE REQUESTS

TECHNICAL FIELD

The present invention relates generally to computing systems and more particularly to online validation of service requests.

BACKGROUND ART

In the past, a computing system included a number of computers connected by a network, which allowed the computers to communicate and pass information and/or data between themselves. The networks ranged from a local system, such as a local area network (LAN), to a very large and expansive network, such as a wide area network (WAN) or the Internet. The computing system also had various operating systems, storage mediums, and other processing resources interconnected and accessible via the network through various software products.

Further, software information service systems and applications were included in the computing system. These systems and applications ranged from commercially available software applications (e.g. spreadsheets, word processors, databases) to custom developed software products tailored for specific use within specific computing systems.

Customers or clients (i.e. companies, organizations, groups or individuals) can also be viewed as part of the computing system. Generally, there are multiple types of clients associated with a distributed computing system including application users, application developers, and system administrators. Within the distributed computing system, the many different clients typically require access to a number of different application systems or processes concurrently and it is necessary to allocate resources and prevent redundant use of resources.

In these types of systems, there is a recurrent problem termed the "online validation problem" (OVP). In the OVP, a group of processes validate some request for service (e.g., if OVP is used to solve a concurrency control problem, the process is requesting to enter the critical section). As the result of the validation, only one process accepts the request (i.e., following the previous example, only one process enters the critical section), and all the others reject the request. A request is accepted if it has not been accepted before, and rejected otherwise.

More specifically, a group of processes want to validate some request for service R. Processes may crash during the execution of the validation so a solution must respect two requirements: (a) if a process accepts R, then no other process accepts R, and a process does not accept R more than once; and (b) if no process, among the ones validating R, crashes, then there is a process that eventually accepts R.

Due to process crashes, solving OVP is not simple, as described next.

(i) Making sure that R is not accepted more than once can be trivially satisfied by a protocol that systematically refuses R. Such solution, however, does not ensure requirement (b). Fulfilling requirements (a) and (b) induce processes to exchange information about the validation of R in such a way that if two (or more) processes validate R, only one accepts it. This is no trivial task because processes have incomplete information about one another.

(ii) One way to ensure requirement (a) is to have a centralized process that decides whether R should be accepted or rejected. Nevertheless, such a solution has a single point of failure: if the process responsible for the decision crashes, requirement (b) will not be satisfied. A solution to this problem is to detect the crash of processes, but this means that failure detection has to be accurate, something difficult to achieve in most practical cases.

(iii) Another way is to have transactional database system to solve OVP, however, in order to guarantee that only one process accepts R in case of failures, the transactional database may have to delay the validation until after some processes recover. Transactional-based solutions may delay the result of the validation and make extra assumptions (i.e., no permanent process crash).

(iv) Solutions relying on perfect failure detection mechanisms can result in unexpected behaviors if the failure detectors make mistakes. Given the unpredictable behavior of commercial network systems, it is hard to tell whether a non-responding process has crashed or is just too busy. It is actually very dangerous to design a system that relies on perfect accuracy of failure detectors. It is difficult to design systems that can rely on unreliable failure detectors because such systems must be flexible enough to accept wrong failure suspicions, but be strong enough to guarantee that some useful computation is performed.

Solutions to problems similar to OVP largely rely on transactional databases to prevent several processes from accepting the same request R. The key idea is to synchronize transactions (e.g., by means of locking) at some central validation server that only allows one transaction related to R to be active at a time. In such a scheme, the first transaction to lock the database record related to R accepts R, and all the others reject R. Relying on a centralized database may block the system in the event of single crashes, and so, does not fulfill requirement (b) presented in the previous section. A solution to this problem is to use a highly available database, which is expensive.

Database systems supporting asynchronous data replication, such as Tandem Remote Data Facility (RDF) and Microsoft SQL Server, are immediately ruled out because such systems provide weak consistency, and may allow R to be accepted more than once even in executions without crashes. Synchronous data replication systems, such as Oracle Parallel Server (OPS), and Informix Extended Parallel Server (XPS) use clusters with or without shared disks, and do not suffer from the same problem. However, a failover requires log based recovery: if one process takes over for a failed process, it must reconcile its own state with the log of the failed process. Moreover, to use a parallel database system as a highly available transaction processing system, database processes on different machines must access the same disks. This requires special hardware/software, such as high availability clusters.

Several protocols have been proposed to implement "quorum systems". Quorum systems are a distributed, fault-tolerant synchronization mechanism for replicated databases and objects in general. Although several variants exist, they essentially all detect conflicting requests by means of quorum intersections. Briefly, in order to treat a request r, a server has to gather the approval of a quorum, for example Q(r), of servers. If requests $r_1$ and $r_2$ conflict, Q($r_1$) and Q($r_2$) are such that there is at least one server in any intersection of Q($r_1$) and Q($r_2$) which detects the conflict, and refuses access to either requests $r_1$ or $r_2$. Quorums are a safety mechanism (i.e., they prevent multiple processes from accepting r), but thus far, no liveness guarantees have been associated with them (i.e., it may happen that even in execution where no process crashes, no process accepts r). Moreover, when used with replicated databases, quorums may lead to distributed deadlocks, which are expensive to resolve.

Mutual exclusion protocols solve the resource allocation problem, which, roughly speaking, requires that at most one process be in the critical section at a time, and if several processes request access to the critical section, one should be granted permission. Given the similarities between OVP and the resource allocation problem, it would be thought that using a mutual exclusion protocol would solve OVP. However, few studies on resource allocation address high availability issues. One study has proposed a modular algorithm for resource allocation in distributed systems that tolerate the failure of some components of the system. However, the study assumes one processor for each resource, and the failure of such processor renders the resource unavailable (although other resources can still be accessed).

Solutions to the OVP have been long sought, but have long eluded those skilled in the art.

DISCLOSURE OF THE INVENTION

The present invention provides a generic protocol with two embodiments that solve the online validation problem (or OVP) in distributed computer systems.

In the first embodiment, to validate a request for service R, a process $p_i$ first checks whether R has been validated before (by $p_i$). Process $p_i$ does this by checking whether R is stored in its local storage. If $p_i$ has not validated R before, $p_i$ broadcasts message $[p_i, R]$ to all processes. Upon delivering a message of the type $[p_k, R]$ for the first time, process $p_i$ (and other processes able to validate R) stores R in its local storage and compares whether the value delivered is the same value it broadcast (i.e., $p_i=p_k$). If so, $p_i$ accepts R; otherwise $p_i$ rejects R.

In the second embodiment, to validate a request for service R, a process $p_i$ first checks whether R has been validated before (by $p_i$). Process $p_i$ does this by checking whether R is stored in its local storage. If $p_i$ has not validated R before, $p_i$ sends message $[p_i, R]$ to all processes. Upon receiving a message of the type $[p_k, R]$, every process $p_j$ stores R in its local storage and executes a "Consensus", proposing value $[p_k, R]$ (i.e., $p_j$ executes propose $([p_k, R],)$). By the properties of Consensus, all processes that remain up enough time execute a decide of some proposed value $[p_l, R]$. After process $p_i$ (and other processes able to validate R) delivers $[p_l, R]$, $p_i$ compares whether the value decided is the same value it proposed (i.e., $p_i=p_l$). If so, $p_i$ accepts R; otherwise $p_i$ rejects R.

The generic protocol implementing OVP solution can be used as a building block to solve abstract problems such as mutual exclusion and quorum allocation, and can also be used directly to validate electronic tickets or electronic coupons on the Internet. The two embodiments of the generic protocol (a) do not depend on any centralized component, (b) can cope with component failures, (c) make very few assumptions about process and message synchrony, and (d) do not rely on a perfect failure detection mechanism to monitor process failures.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
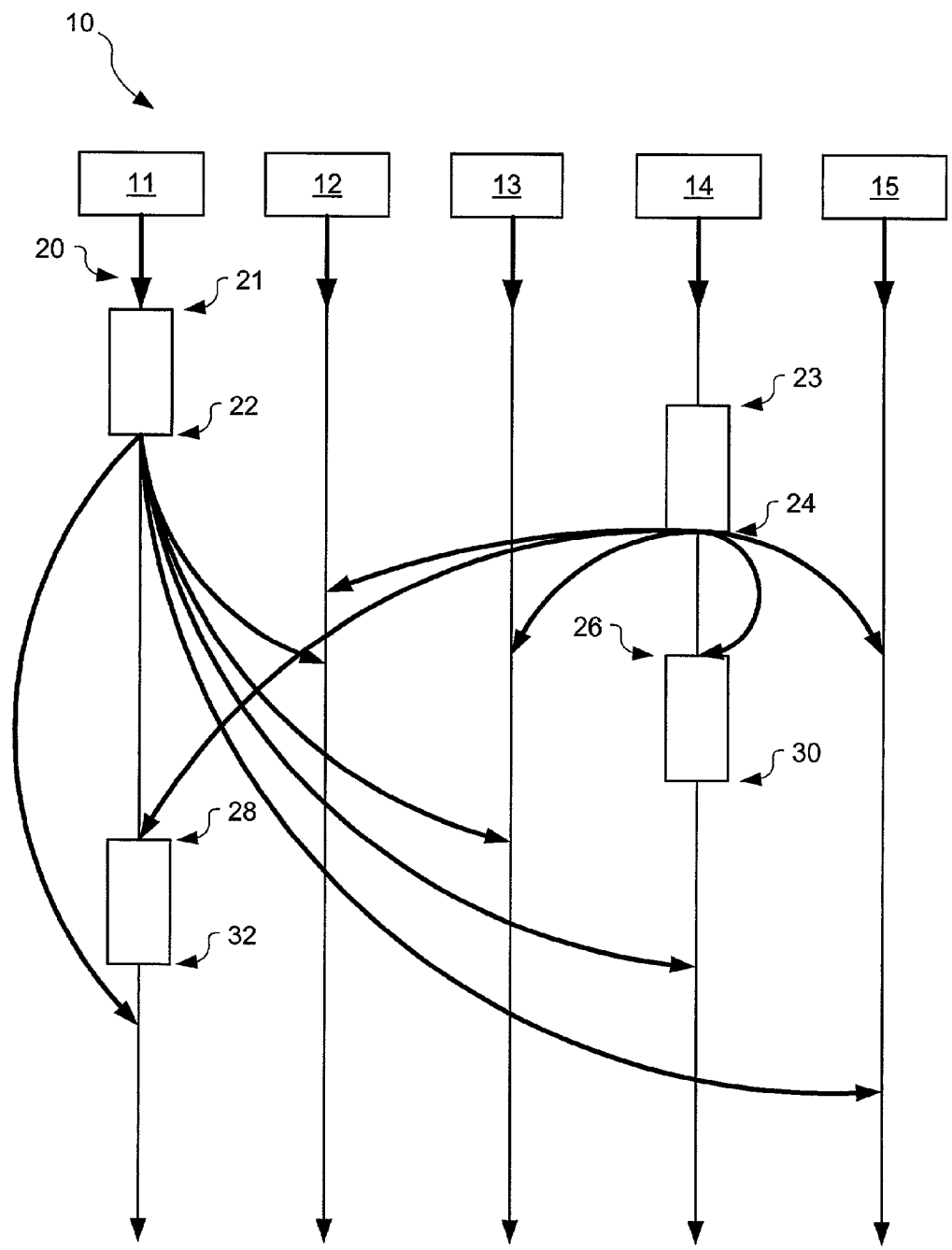
FIG. 1 depicts an example of the execution of a first embodiment of the generic protocol of the present invention.
Figure 2:
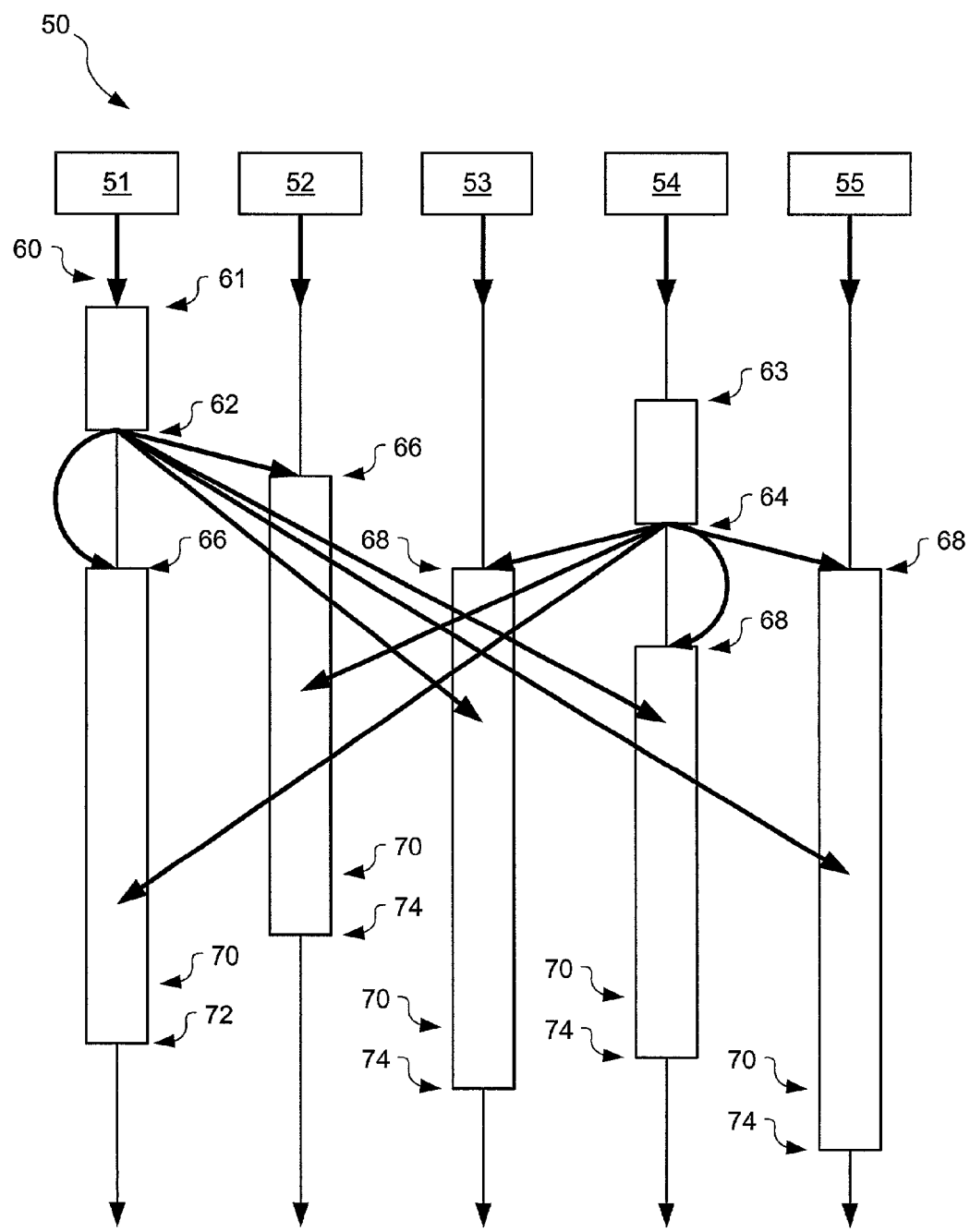
FIG. 2 depicts an example of the execution of a second embodiment of the generic protocol of the present invention.

Referring now to both FIGS. 1 and 2, therein are shown distributed systems 10 and 50. The distributed system 10 has n processes 11, 12, 13, 14, and 15. The distributed system 50 has n processes 51, 52, 53, 54, and 55. A process can be, for example, a server or a UNIX process. The processes do not behave maliciously, and can only fail by crashing. Each process has access to some local storage (not shown), which is not shared with any other process.

The processes are generally connected through reliable channels and, although there may be link failures, any link failure is eventually repaired. In practice, retransmitting messages and tracking duplicates implement the abstraction of reliable channels. The reliable channels are defined by the primitives send and receive.

The processes can use an "Atomic Broadcast" abstraction or a "Consensus" abstraction, as defined hereinafter. Atomic Broadcast and Consensus are basic abstractions used by many distributed protocols as building blocks. Other than having Atomic Broadcast and Consensus abstractions implemented, the present invention is independent of the relative speeds of the processes and message transmission.

Referring now to FIG. 1, therein is shown an example of the execution of a first embodiment of the generic protocol of the present invention in the distributed system 10, which has processes using the Atomic Broadcast abstraction.

Atomic Broadcast is defined by the primitives broadcast (message) and deliver(message), and guarantees that (i) if a process delivers a message m, then all processes eventually deliver m, (ii) if two processes, $p_i$ and $p_j$, both deliver messages $m_1$ and $m_2$, then $p_i$ delivers $m_1$ before $m_2$ if and only if $p_j$ delivers $m_1$ before $m_2$, and (iii) if process $p_i$ broadcasts message m, and remains up enough time, then $p_i$ delivers m.

To validate a request for service R, a process $p_i$ first checks whether R has been validated before (by $p_i$). Process $p_i$ does this by checking whether R is stored in its local storage. If $p_i$ has not validated R before, $p_i$ broadcasts a message $[p_i, R]$ to all processes. Upon delivering the message of the type $[p_k, R]$ for the first time, process $p_i$ (and other processes able to validate R) stores R in its local storage and compares whether the value delivered is the same value it broadcast (i.e., $p_i=p_k$). If so, $p_i$ accepts R; otherwise $p_i$ rejects R.

In the distributed system 10 for example, the request for service, a request 20, is provided to the processes 11 through 15. The request 20 is received first by the process 11 and slightly later by the process 14.

In the process 11, the process 11 first checks at validate request 21 whether the request 20 has been validated before by the process 11. The process 11 does this by checking whether the request 20 is stored in its local storage (not shown). When the process 11 has not validated the request 20 before, the process 11 broadcasts 22 a message having information indicating that it originates with the process 11 and is for the request 20. The broadcast 22 is sent to the processes 11 through 15. The request 20 is then stored in the process 11.

In the process 14, the same check is performed at validate request 23 and when the process 14 has not validated the request 20 before, the process 14 broadcasts 24 a message having information indicating that it originates with the process 14 and is for the request 20. The broadcast 24 is also sent to the processes 11 through 15. The request 20 is then stored in the process 14.

In the distributed system 10, the broadcast 24 is delivered 26 to all processes before the broadcast 22 is delivered 28. Upon delivery of the broadcast 24, the processes 11 and 14 store the request 20 in their local storage and then compare whether the value delivered has been validated before.

In the example, since the process 14 has previously validated the request 20, it accepts 30 the request 20.

Since the process 11 delivers 28 the broadcast message 24 before process 11 delivers the broadcast message 22, process 11 rejects the request 20.

Referring now to FIG. 2, therein is shown an example of the execution of a second embodiment of the generic protocol of the present invention in the distributed system 50, which has processes using the Consensus abstraction.

Consensus is defined by the primitives propose(value) and decide(value), and guarantees that (i) every process that remains up enough time decides a value, (ii) no two processes decide a different value, and (iii) if a process decides a value v, then v was proposed by some process.

To validate a request for service R, a process $p_i$ first checks whether R has been validated before (by $p_i$), as done in the first embodiment of the generic protocol. If $p_i$ has not validated R before, $p_i$ sends message $[p_i, R]$ to all processes. Upon receiving a message of the type $[p_k, R]$, every process $p_j$ stores R in its local storage and executes a Consensus, proposing value $[p_k, R]$ (i.e., $p_j$ executes propose $([p_k, R],)$). By the properties of Consensus, all processes that remain up enough time execute a decide of some proposed value $[p_l, R]$. After process $p_i$ (and all other processes able to validate R) delivers $[p_l, R]$, $p_i$ compares whether the value decided is the same value it proposed (i.e., $p_i=p_l$). If so, $p_i$ accepts R; otherwise $p_i$ rejects R.

In the distributed system 50 for example, the request for service, a request 60, is provided to the processes 51 through 55. The request 60 is received first by the process 51 and slightly later by the process 54.

In the process 51, the process 51 first checks at validate request 61 whether the request 60 has been validated before by the process 51. The process 51 does this by checking whether the request 20 is stored in its local storage in the same fashion as for the first embodiment. When the process 51 has not validated the request 60 before, the process 51 sends 62 messages having information indicating that the message originates with the process 51 and is for the request 60. The messages are sent to the processes 51 through 55.

In the process 54, the same check is performed at validate request 63 and when the process 54 has not validated the request 60 before, the process 54 sends 64 messages having information indicating that the message originates with the process 54 and is for request 60. The messages are also sent to the processes 51 through 55.

In the distributed system 50, the send 62 from the process 51 is sent before the send 64 from the process 54. The send 62 reaches the processes 51 and 52 first and the send 64 reaches the processes 53 through 55 first.

Upon receiving the messages sent, each of the process 51 through 55 stores the request 60 in its local storage and executes a Consensus. The processes 51 and 52 propose 66 a value i representative of the process 51 and the request 60. The processes 53 through 55 propose 68 a value k representative of the process 54 and the request 60. By the properties of Consensus, all processes that remain up enough time execute a decide 70 of i or k. After the process 51 (and all other processes that validate the request 60) delivers i, the process 51 compares whether the value decided is the same value it proposed.

In the example, since the value from the process 51 is i, the process 51 accepts 72 the request 60.

Since the value from the process 54 is k, the processes 52 through 55 reject 74 the request 60.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for validation of a service request in a distributed computing system comprising:
   providing a request for service;
   providing a plurality of channels connected to a client; and
   providing first and second processes connected to the plurality of channels for validating the request for service;
   determining in the first and second processes that the request for service has not been previously validated;
   transmitting from the first and second processes messages having information indicative of the transmitting from the first or second process and the request for service;
   storing the information in the first and second processes; and
   accepting the request for service in the first or second process after the messages are transmitted and message related information is different from the information stored in the respective first or second process.

2. The method of validating a service request as claimed in claim 1 including:
   rejecting the request for service in the first or second process when the message related information is the same as the information stored in the respective first or second process.

3. The method of validating a service request as claimed in claim 1 wherein:
   transmitting the message broadcasts the message;
   storing the information stores the information after broadcasting the message; and the message contains the message related information.

4. The method of validating a service request as claimed in claim 1 wherein:
   transmitting the message sends the message; and
   storing the information stores the information after receiving the sent message.

5. The method of validating a service request as claimed in claim 1 wherein:
   transmitting the message sends the message; and
   storing the information stores the information after receiving the sent message;

and including:
    executing a consensus after receiving the message to propose consensus information; and
    the consensus information is the message related information.

6. A method of validating a service request comprising:
providing a request for service;
providing a plurality of channels connected to a client;
providing a plurality of processes connected to the plurality of channels for validating the request for service;
determining in the plurality of processes that the request for service has not been previously validated;
transmitting from the plurality of processes values indicative of the transmitting from the each of the plurality of processes and the request for service;
storing the value in the plurality of processes; and
accepting the request for service in one of the plurality of processes after the value is transmitted and a value related to the value transmitted is different from the value stored in the one of the plurality of processes.

7. The method of validating a service request as claimed in claim 6 including:
rejecting the request for service in others of the plurality of processes when the value related to the value transmitted is the same as the value stored in the others of the plurality of processes.

8. The method of validating a service request as claimed in claim 6 wherein:
transmitting the value broadcasts the value; and
storing the value stores the value after the value is broadcast.

9. The method of validating a service request as claimed in claim 6 wherein:
transmitting the value sends the value; and
storing the value stores the value after receiving the sent value.

10. The method of validating a service request as claimed in claim 6 including:
transmitting the value by sending, and
executing a consensus after receiving the value to propose a consensus value; and wherein:
    storing the value stores the value after receiving the sent value; and
    the consensus value is the value related to the value transmitted.

11. A distributed computing system comprising:
a client for providing a request for service;
a plurality of channels connected to the client; and
first and second processes connected to the plurality of channels for validating the request for service wherein the first and second processes each includes:
    means for determining that the request for service has not been previously validated;
    means for transmitting a message having information indicative of the transmitting from the first or second process and the request for service;
    means for storing the information; and
    means for accepting the request for service in the first or second process after the message is transmitted and message related information is different from the information stored in the respective first process or second process.

12. The distributed computing system as claimed in claim 11 wherein:
the first and second processes each includes means for rejecting the request for service in the first or second process when the message related information is the same as the information stored in the respective first or second process.

13. The distributed computing system as claimed in claim 11 wherein:
the means for transmitting the message broadcasts the message; and
the means for storing the information stores the information after broadcasting the message and the message contains the message related information.

14. The distributed computing system as claimed in claim 11 wherein:
the first and second processes include means for transmitting the message by sending; and
the first and second processes each include means for storing the information after receiving the sent message.

15. The distributed computing system as claimed in claim 11 wherein:
the first and second processes include means for transmitting the message by sending;
the first and second processes each include means for storing the information after receiving the sent message;
the first and second processes each includes means for executing a consensus after receiving the message to propose consensus information; and
the consensus information is the message related information.

16. A distributed computing system comprising:
a client for providing a request for service;
a plurality of channels connected to the client; and
a plurality of processes connected to the plurality of channels for validating the request for service wherein the plurality of processes each includes:
    means for determining that the request for service has not been previously validated;
    means for transmitting a value indicative of the transmitting from the one of the plurality of processes and the request for service;
    means for storing the value; and
    means for accepting the request for service in the one of the plurality of processes after the value is transmitted and a value related to the value transmitted is different from the value stored in the one of the plurality of processes.

17. The distributed computing system as claimed in claim 16 wherein:
the plurality of processes each includes means for rejecting the request for service in others of the plurality of processes when the value related to the value transmitted is the same as the value stored in the others of the plurality of processes.

18. The distributed computing system as claimed in claim 16 wherein:
the means for transmitting the value broadcasts the value; and
the means for storing the value stores the value after the value is broadcast.

19. The distributed computing system as claimed in claim 16 wherein:
the plurality of processes include means for transmitting the value by sending; and
the plurality of processes each includes means for storing the value after receiving the sent value.

20. The distributed computing system as claimed in claim 16 wherein:
   the plurality of processes includes means for transmitting the value by sending;
   the plurality of processes each includes means for storing the value after receiving the sent value;
   the plurality of processes each includes means for executing a consensus after receiving the value to propose a consensus value; and
   the consensus value is the value related to the value transmitted.

* * * * *

UNITED STATES PATENT AND TRADEMARK OFFICE
CERTIFICATE OF CORRECTION

PATENT NO. : 7,051,065 B2
APPLICATION NO. : 09/931989
DATED : May 23, 2006
INVENTOR(S) : Fernando Pedone Page 1 of 1

It is certified that error appears in the above-identified patent and that said Letters Patent is hereby corrected as shown below:

In column 3, lines 49-50, delete "$[p_i, R]$" and insert -- $[p_l, R]$ --, therefor.

Signed and Sealed this

Twenty-eighth Day of April, 2009

JOHN DOLL
*Acting Director of the United States Patent and Trademark Office*